US010046666B2

(12) United States Patent
Wei et al.

(10) Patent No.: US 10,046,666 B2
(45) Date of Patent: Aug. 14, 2018

(54) VEHICLE COMPRISING A BIFUNCTIONAL STRUCTURAL PART

(71) Applicants:Ningbo Wise Digital Technology Co., Ltd, Ningbo (CN); Xibo Wei, Ningbo (CN); Yuanyuan Li, San Jose, CA (US)

(72) Inventors: Xibo Wei, Ningbo (CN); Yuanyuan Li, San Jose, CA (US); Jingjing Wei, Ningbo (CN)

(73) Assignee: Ningbo Wise Digital Technology Co., Ltd, Ningbo (CN)

( * ) Notice: Subject to any disclaimer, the term of this patent is extended or adjusted under 35 U.S.C. 154(b) by 69 days.

(21) Appl. No.: 15/344,547

(22) Filed: Nov. 6, 2016

(65) Prior Publication Data
US 2017/0050533 A1 Feb. 23, 2017

Related U.S. Application Data

(60) Provisional application No. 62/251,646, filed on Nov. 5, 2015.

(51) Int. Cl.
*B60L 11/18* (2006.01)
*H01M 4/46* (2006.01)
(Continued)

(52) U.S. Cl.
CPC ............ *B60L 11/1879* (2013.01); *B64C 1/12* (2013.01); *B64C 39/024* (2013.01); *H01G 11/04* (2013.01); *H01G 11/08* (2013.01); *H01G 11/22* (2013.01); *H01G 11/66* (2013.01); *H01G 11/82* (2013.01); *H01M 2/1083* (2013.01); *H01M 4/463* (2013.01); *H01M 12/04* (2013.01); *B60L 2200/10* (2013.01); *B64C 2001/0081* (2013.01); *B64C 2201/042* (2013.01); *B64C 2201/066* (2013.01); *H01M 2220/20* (2013.01)

(58) Field of Classification Search
CPC ............... B60L 11/1879; B64C 39/024; B64C 2201/042; H01G 11/08; H01G 11/82; H01M 2/1083; H01M 4/463; H01M 2220/20
See application file for complete search history.

(56) References Cited

U.S. PATENT DOCUMENTS 4,768,738 A * 9/1988 Weinert .................. B64C 25/10
136/244
5,810,284 A * 9/1998 Hibbs ..................... B64C 39/10
244/13
(Continued)

OTHER PUBLICATIONS

S. Edstedt, "Structural Batteries made from Fibre reinforced composites", Online academic publication.
(Continued)

*Primary Examiner* — Christopher P Ellis
(74) *Attorney, Agent, or Firm* — Guosheng Wang; United States Research and Patent Firm

(57) ABSTRACT

The present invention provides a vehicle comprising a power source such as a primary battery, a secondary battery, and a supercapacitor. The power source includes a plurality of components. At least one of the plurality of components serves as at least a portion of the structural part of the vehicle. The power source is integrated with the structure of the vehicle, and improves the endurance of the vehicle.

18 Claims, 15 Drawing Sheets

(51) Int. Cl.
  H01M 2/10 (2006.01)
  B64C 1/12 (2006.01)
  B64C 39/02 (2006.01)
  H01G 11/22 (2013.01)
  H01G 11/66 (2013.01)
  H01G 11/04 (2013.01)
  H01M 12/04 (2006.01)
  H01G 11/08 (2013.01)
  H01G 11/82 (2013.01)
  B64C 1/00 (2006.01)

(56) References Cited

U.S. PATENT DOCUMENTS

| | | | | |
|---|---|---|---|---|
| 6,496,151 | B1* | 12/2002 | Ferreri | H01Q 1/286 343/708 |
| 6,868,314 | B1* | 3/2005 | Frink | B64C 1/00 244/119 |
| 7,762,495 | B2* | 7/2010 | Miller | B64C 39/024 126/573 |
| 8,201,773 | B1* | 6/2012 | Durham | B64C 39/028 244/218 |
| 9,315,267 | B2* | 4/2016 | Pan | B64C 39/024 |
| 2004/0211862 | A1* | 10/2004 | Elam | A63H 27/02 244/58 |
| 2011/0073717 | A1* | 3/2011 | Foucault | B64D 27/24 244/53 R |
| 2013/0285440 | A1* | 10/2013 | Pan | B60L 8/003 307/9.1 |
| 2014/0061376 | A1* | 3/2014 | Fisher | B60K 1/00 244/62 |
| 2014/0316616 | A1* | 10/2014 | Kugelmass | G05D 1/101 701/8 |
| 2016/0031564 | A1* | 2/2016 | Yates | B64D 33/00 307/9.1 |
| 2016/0221671 | A1* | 8/2016 | Fisher | B64C 27/08 |
| 2016/0254576 | A1* | 9/2016 | Burns | B64D 27/24 429/61 |
| 2017/0217585 | A1* | 8/2017 | Hulsman | B64C 29/02 |
| 2017/0260973 | A1* | 9/2017 | Larson | B64C 3/56 |
| 2017/0327219 | A1* | 11/2017 | Alber | B64C 29/02 |
| 2017/0349281 | A1* | 12/2017 | Quinlan | B64C 39/024 |

OTHER PUBLICATIONS

The Economist, "Multi-Function materials for building and powering electric cars", Apr. 26, 2010, Online extra.

Leif et al., "Multifunctional composite materials for energy storage in structural load paths", Denver, Nov. 12, 2012, Swerea Sicomp.

* cited by examiner

VEHICLE COMPRISING A BIFUNCTIONAL STRUCTURAL PART

CROSS-REFERENCE TO RELATED U.S. APPLICATIONS

The application claims benefit of U.S. Provisional Application No. 62/251,646, filed on Nov. 5, 2015, entitled "Battery-Integrated Aircraft Structural Parts", the entire disclosure of which is incorporated herein by reference.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

FIELD OF THE INVENTION

The present invention generally relates to a vehicle comprising a bifunctional structural part. More particularly, the vehicle includes a power source and a structural part. The power source includes a plurality of components, and at least one of the plurality of components serves as at least a portion of the structural part. Although the disclosure will use an unmanned aerial vehicle (UAV) such as a rotorcraft and an electric car as representative examples, it should be appreciated that the present invention may find applications with other vehicles such as an aircraft, a spacecraft, a watercraft including sub-surface watercraft, and a land vehicle e.g. an electric truck.

BACKGROUND OF THE INVENTION

Electrical vehicles represent a popular trend for transporting human passengers and cargo. For example, electric cars have several benefits over conventional internal combustion engine automobiles, including a significant reduction of local air pollution, especially in cities, as they do not emit harmful tailpipe pollutants such as particulates (soot), volatile organic compounds, hydrocarbons, carbon monoxide, ozone, lead, and various oxides of nitrogen. An electric car is propelled by one or more electric motors, using electrical energy stored in rechargeable batteries or another energy storage device. Electric motors give electric cars instant torque, creating strong and smooth acceleration. However, it remains a challenge to improve the range or endurance of an electric car.

People have also attempted to use smaller electrical aircraft to rapidly deliver parcels and packages to millions of customer's households. The most promising aircraft is Unmanned Aerial Vehicles (UAVs), which are unpiloted aircraft that are either controlled remotely or flown autonomously along pre-programmed flight plans. UAVs are commonly categorized based on their design and performance specifications spanning a range from miniature low altitude aircraft through large High Altitude Long Endurance (HALE) vehicles. Small low altitude UAVs (AKA drones) is preferred for civil delivery system. However, there are still some challenges posed in the design, manufacturing, and operation of the UAVs. One of such challenges is the flight endurance of UAVs. In aviation, endurance is the maximum length of time that an aircraft can spend in cruising flight. Endurance is different from range, which is a measure of distance flown. For example, a typical sailplane exhibits high endurance characteristics but poor range characteristics.

The current lithium-ion batteries, due to smaller size and relatively high energy density, are not only widely used in mobile devices such as mobile phones, and laptops as a power sources, but also used in the fields of electric vehicles (EV), energy storage and the like. However, the battery performance for EV and electric aircraft, especially for UAVs, cannot meet the requirements for extended time of endurance. Existing drones or UAVs have to be substantially modified in terms of design and manufacturing process. The major methods to improve the endurance are: 1) to develop new battery technology in order to improve energy storage capacity of the battery; 2) to reduce the weight of UAV or drones.

Advantageously, the present invention meets the aforementioned challenges, and provides a solution to overcome the problems.

SUMMARY OF THE INVENTION

One aspect of the present invention provides a vehicle comprising a power source such as a primary battery, a secondary battery, a film capacitor, and a supercapacitor. The power source includes a plurality of components. At least one of the plurality of components serves as at least a portion of the structural part of the vehicle.

In various embodiments of the invention, battery components are fabricated into certain structural parts of UAVs, drones, electric vehicles, and mobile devices. The energy storage battery will serve as both the body parts and power source, and become a "Body Parts Battery".

In preferred embodiments, the structural part functions as a substrate, an electrode (i.e. an anode or a cathode), a current collector, a bipolar plate, a negative plate, a positive plate, a battery housing, a capacitor housing, a supercapacitor housing, or any combination thereof, for the power source. In preferred embodiments, the power source takes the form of thin film or sheet. The thin film power source can be formed by a process of "coating" or adhering on the surface of said at least a portion of the structural part of the vehicle.

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form in order to avoid unnecessarily obscuring the present invention. Other parts may be omitted or merely suggested.

FIG. 11B shows a few examples of vehicle in the prior art such as a rotary-wing aircraft, a fixed-wing aircraft, and an electric car.

DETAILED DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement.

Where a numerical range is disclosed herein, unless otherwise specified, such range is continuous, inclusive of both the minimum and maximum values of the range as well as every value between such minimum and maximum values. Still further, where a range refers to integers, only the integers from the minimum value to and including the maximum value of such range are included. In addition, where multiple ranges are provided to describe a feature or characteristic, such ranges can be combined.

Figure 1A:
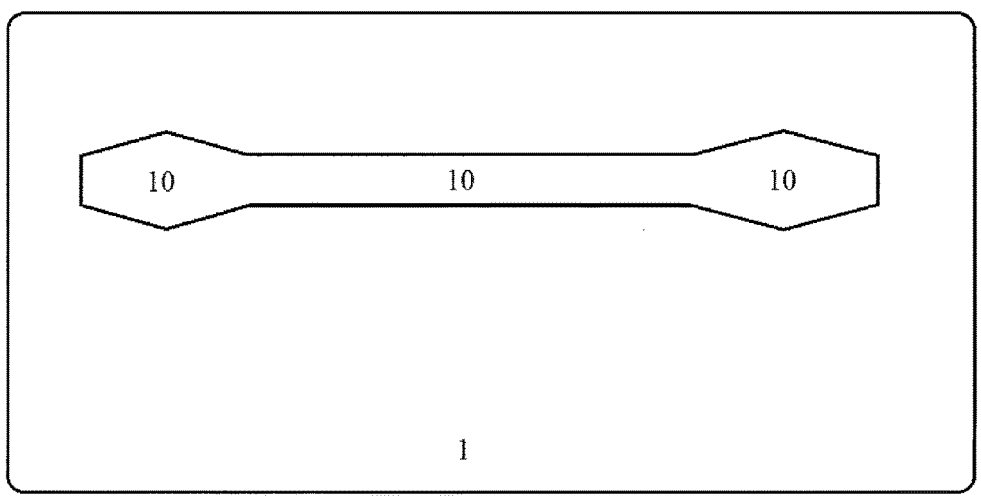
FIG. 1A illustrates a conceptual vehicle in the prior art that comprises at least one structural part.
Figure 1B:
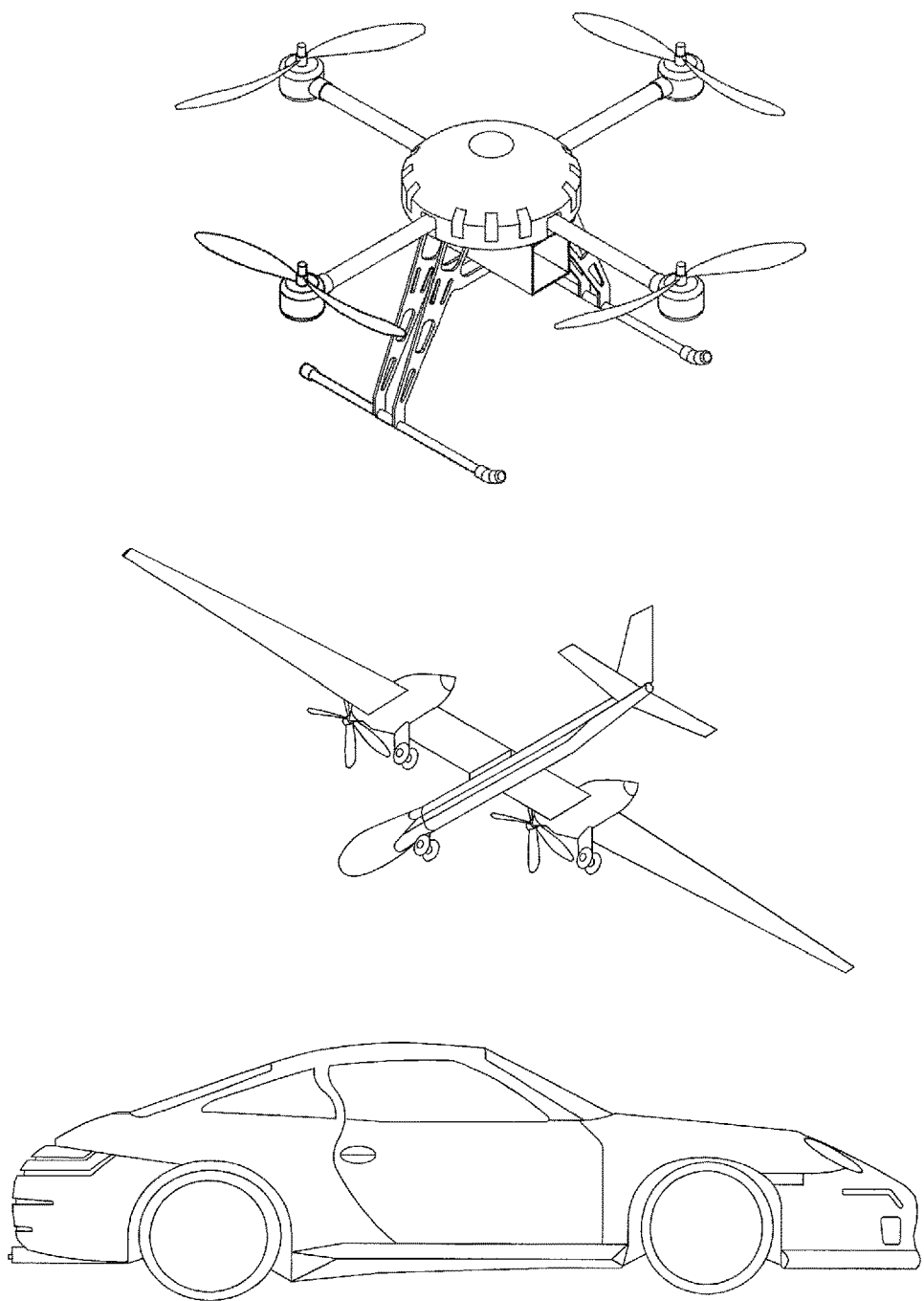

FIG. 1A illustrates a conceptual vehicle 1 in the prior art that includes a conceptual structural part 10. The vehicle in reality may be an unmanned aerial vehicle (UAV), an electric car, an aircraft, a spacecraft, a watercraft including sub-surface watercraft, and a land vehicle. FIG. 1B shows a few representative examples of vehicle 1, one of which may be a rotary-wing aircraft with wings (propellers) mounted on a spinning rotor shaft. Vehicle 1 can also be a fixed-wing aircraft, which generates lift by the vehicle's forward airspeed and the shape of the wings. Vehicle 1 can be an electric car as well. Typically, vehicle 1 consists of hundreds or thousands of structural parts, ranging from big parts such as aircraft wings to small parts such as nuts and bolts.

Figure 2:
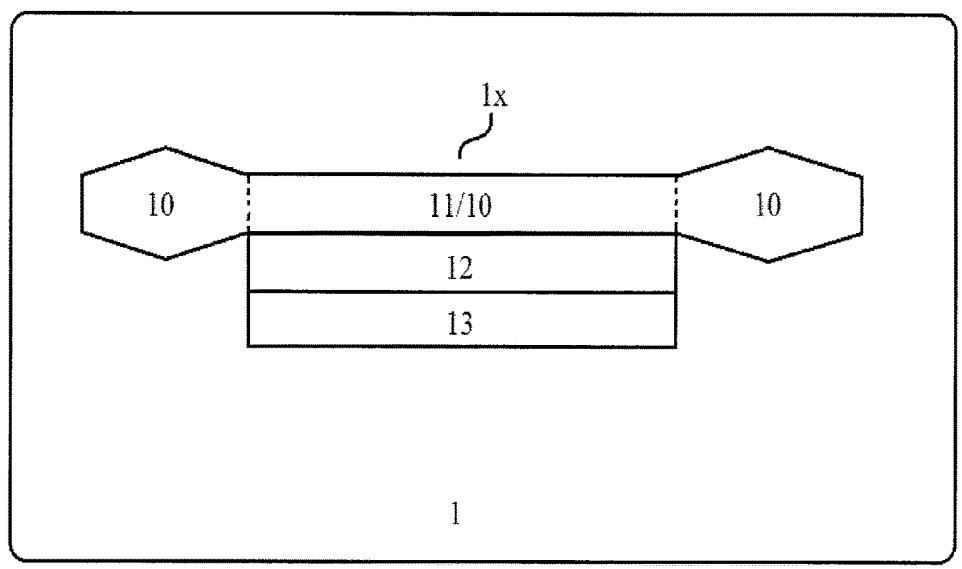
FIG. 2 illustrates a conceptual vehicle including a bifunctional structural part or bifunctional power source in accordance with an exemplary embodiment of the present invention.

FIG. 2 demonstrates an improved vehicle 1 according to the present invention. A power source $1x$ is incorporated into vehicle 1. There is no specific limitation on the size, amount, configuration, shape, position, orientation, chargeability (rechargeable or not), rigidity (flexible or rigid) and energy density of the power source $1x$. Examples of power source include, but are not limited to, a primary battery, a secondary battery, and a supercapacitor. Specific examples of power source include, but are not limited to, lithium batteries, supercapacitor, gel battery, nickel hydrogen batteries, nickel cadmium batteries, fuel cells, zinc batteries, photovoltaic batteries, and liquid battery. In preferred embodiments, power source $1x$ is solid state lithium battery and semi-solid lithium battery with the high energy density and good safety performance. Power source $1x$ may consist of a single cell or a combination of a plurality of battery packs. The DC output voltage of power source $1x$ is preferably in the range of from 1.5 V to 36 V. The wiring between batteries and between battery and various loads in vehicle 1 can be implemented using any known methods and designs in the field of electrical engineering. For example, a battery management system (BMS) may be employed to protect the battery from operating outside its safe operating area, monitors its state, and calculates secondary data, reports that data, controls its environment, authenticates it, and balances it. A BMS may also monitor the state of the battery including voltage such as total voltage, voltages of individual cells, minimum and maximum cell voltage or voltage of periodic taps; temperature such as average temperature, coolant intake temperature, coolant output temperature, and temperatures of individual cells; state of charge (SOC) or depth of discharge (DOD) to indicate the charge level of the battery; state of health (SOH) indicating the overall condition of the battery; coolant flow if the battery is cooled by air or fluid; as well as current in or out of the battery.

A power source also contains a plurality of components such as conceptual components 11, 12 and 13 as shown in FIG. 2. For example, anode is a negative electrode at which electrons leave the cell and oxidation occurs, and cathode is a positive electrode at which electrons enter the cell and reduction occurs. The power sources can be combined in series to yield higher voltage, and/or in parallel to supply a higher current. For example, a stack of cells is also within the scope of the present invention, and a bipolar electrode can function as the anode of one cell and the cathode of another cell. For a secondary or rechargeable battery, when the battery is being charged, the anode becomes the positive electrode and the cathode becomes the negative electrode. An electrical insulator is used to separate anode and cathode to prevent shortcut. Electrolyte may be in the form of liquid, gel, paste or solid. Gel electrolytes are liquids in a flexible lattice framework. Paste electrolyte is used for dry cells such as zinc-carbon battery. Examples of solid electrolyte include dry polymer electrolytes, solid ceramic electrolytes, and ionic plastic crystals.

In a preferred embodiment, the ionic compound of the electrolyte in the battery integrated structural parts of the present invention is suitable for the aircraft flying in the elevated altitude, and the compound will remain conductive in wide temperature range of −25 C. to 100 C.

At least one of these components, such as component 11, "merges" into structural part 10, and it becomes, and functions as, a portion of structural part 10. Viewed from a different angle, a portion of structural part 10 "merges" into component 11, and it becomes, and functions as, component 11 in power source 1x. The term "bifunctional" hereinafter is intended to describe any part/component like 10/11 as shown in FIG. 2, because it serves a function associated with power source 1x on one hand, and serves a function associated with structural part 10 on another. For example, a "bifunctional battery" is intended to mean that the battery serves as a structural part too; a "bifunctional electrode" is intended to mean that the electrode serves as a structural part too; and a "bifunctional fuselage" is intended to mean that the fuselage serves as a part of the power source too.

Some embodiments of the invention provide Battery-Integrated Aircraft Structural Parts (BIASP) by integrating electrochemical-energy materials into electric aircraft structural parts and the bodywork of a vehicle, which functions not only as the mechanical bearing structural parts but as battery components as well.

Figure 3:
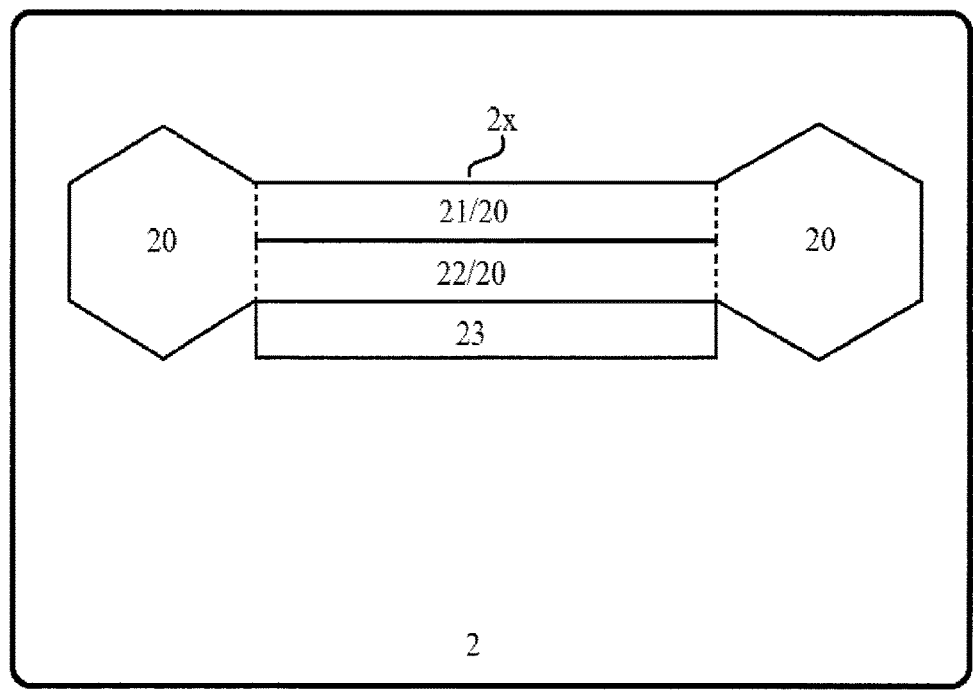
FIG. 3 illustrates another conceptual vehicle including a bifunctional structural part or bifunctional power source in accordance with an exemplary embodiment of the present invention.

FIG. 3 demonstrates an improved vehicle 2 according to the present invention. Similar to vehicle 1, a power source 2x is incorporated into vehicle 2. Examples of power source include, but are not limited to, a primary battery, a secondary battery, and a supercapacitor. A power source also contains a plurality of components, for example, conceptual components 21, 22 and 23 as shown in FIG. 3. Two components 21 and 22 "merge" into structural part 20, and they become, and function as, a portion of structural part 20. Viewed from a different angle, a portion of structural part 20 "merges" into components 21 and 22, and it becomes, and functions as, components 21 and 22 in power source 2x. As a result, part/component 20/21 (or 20/22) as shown in FIG. 3 becomes a bifunctional part in vehicle 2, or a bifunctional component in power source 2x.

Figure 4:
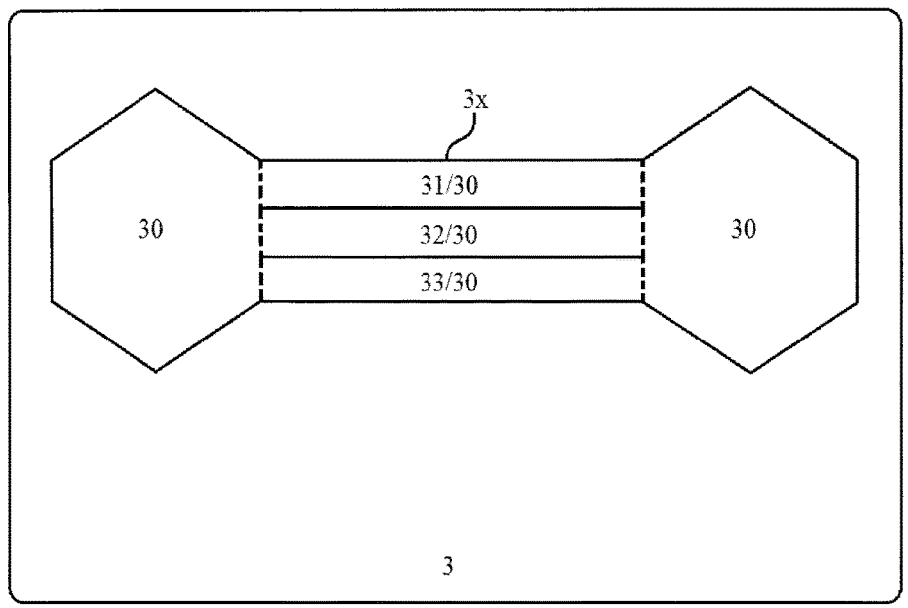
FIG. 4 illustrates still another conceptual vehicle including a bifunctional structural part or bifunctional power source in accordance with an exemplary embodiment of the present invention.
Figure 4:
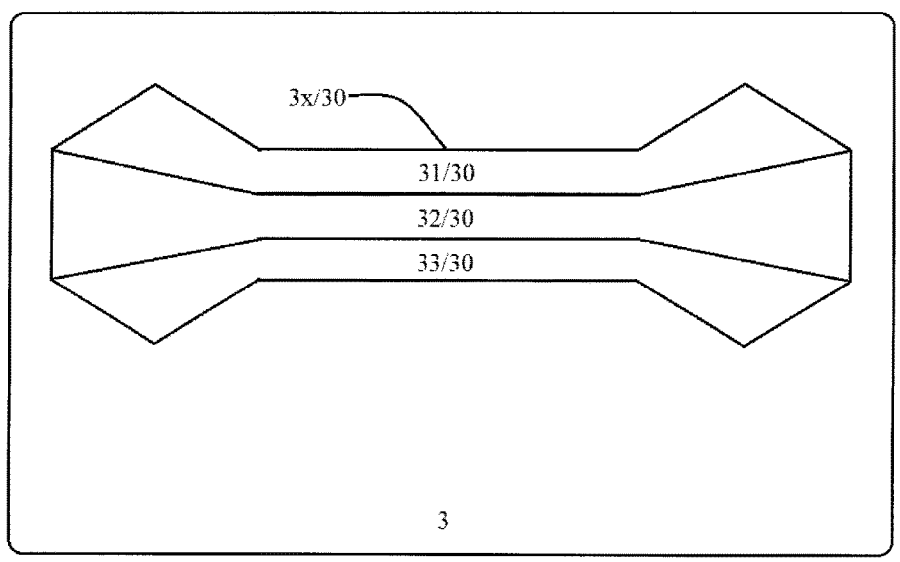

FIG. 4 demonstrates an improved vehicle 3 according to the present invention. A power source 3x is incorporated into vehicle 3. A power source contains conceptual components 31, 32 and 33 as shown in FIG. 4. All the three components 31, 32 and 33 "merge" into structural part 30, and they become, and function as, a portion, or the entirety, of structural part 30. Viewed from a different angle, a portion, or the entirety, of structural part 30 "merges" into components 31, 32 and 33, and it becomes, and functions as, components 31, 32 and 33 in power source 3x. As a result, part/component 30/31 or 30/32 or 30/33 as shown in FIG. 4 becomes a bifunctional part in vehicle 3, or a bifunctional component in power source 3x.

Power sources 1x, 2x and 3x may be called bifunctional power sources. When they are batteries, capacitors or supercapacitors, they can be called bifunctional batteries, bifunctional capacitors or bifunctional supercapacitors.

As described above, the power source of the invention may be a primary battery, a secondary battery, a film capacitor, a supercapacitor, or any combination thereof. There no specific limitation on the bifunctional component therein, but in preferred embodiments, the bifunctional component is electrically conductive and mechanically robust. For example, bifunctional component may include an electrode (i.e. an anode or a cathode), a current collector, a bipolar plate, a negative plate, a positive plate, a battery housing, a supercapacitor housing, a wire, and the like. The bifunctional component may be made of a metal, an alloy, a conductive polymer, a carbon fiber or graphite reinforced polymer (CFRP), carbon nanotube reinforced polymer (CNRP), graphene, or any combination thereof. For example, the metal or the alloy may comprise Aluminum, Iron, Lithium, Magnesium, Manganese, Copper, Zinc, Zirconium, Chromium, Titanium, Scandium, Silicon, Germanium, Calcium, Potassium, Sodium, Tin, or any alloy thereof, or any combination thereof. Such bifunctional component may function as at least a portion of a structural part in the vehicle, for example, aircraft wings, aircraft fuselages, aircraft skin, valve body, watercraft hull, connecting rod, car floor, car roof, car fender, car bumper, car decklid, car rocker, car door, vehicle window frame, vehicle door frame, pipe, rod, car chassis, wheel spacer, and so on. For example, a drone may include right and left wings, main hatch, under the hatch before, tail pipe, horizontal tail, and vertical tail. An aircraft wing includes skin panel, front spar, central spar, rear spar, ribs, stringers, and aluminum pipe. A quadrotor includes basic frame, camera mounting frame, landing bar, and landing gear etc.

Bifunctional Primary Battery

In a first group of embodiments, the power source of the invention is a bifunctional primary battery. The electrochemical reaction occurring in primary battery is not reversible, rendering it unrechargeable. For example, the reduction of $MnO_2$ into $Mn_2O_3$ by Zn in a zinc-carbon battery and alkaline battery is irreversible. Therefore, a primary battery can only be used once and then discarded. It cannot be recharged and reused like a secondary battery. According to an embodiment of the present invention, a bifunctional primary battery of the invention is made replaceable in the vehicle, preferably it is a replaceable module for the purpose of mass production and convenient replacement.

Bifunctional fuel cell is a preferred example of the power source according to the present invention. For example, the bipolar plate, the anode and/or the cathode in the fuel cell can be made bifunctional. A bipolar plate may be made of different types of materials such as metal, coated metal, graphite, flexible graphite, C—C composite, and carbon-polymer composites etc. The fuels that are oxidized in the presence of a catalyst at the anode may include hydrogen, and hydrocarbon such as diesel, methanol and hydrides. In a proton exchange membrane fuel cell using e.g. nafion, the anode catalyst may be made up of very fine platinum powder, and the cathode catalyst may be made up of nickel, or a nanomaterial-based catalyst. Although a bifunctional proton exchange membrane fuel cell is the preferred embodiment, other bifunctional fuel cells are also within the contemplation of the present invention, for example, direct borohydride fuel cell, alkaline fuel cell, direct carbon fuel cell, direct formic acid fuel cell (DFAFC), direct methanol fuel cell, electro-galvanic fuel cell, metal hydride fuel cell, molten carbonate fuel cell, phosphoric acid fuel cell, planar solid oxide fuel cell, reformed methanol fuel cell, regenerative fuel cell, solid acid fuel cell, tubular solid oxide fuel cell (TSOFC), direct-ethanol fuel cell, enzymatic biofuel cells, microbial fuel cell, protonic ceramic fuel cell, and upflow microbial fuel cell (UMFC).

Another preferred bifunctional primary battery in the invention is a metal-air battery, which uses an anode made from metal or alloy and a cathode of ambient air or other oxygen sources. The bifunctional component may be the metal anode or the alloy anode, and alternatively or additionally, it may be the current collector (if any) in the air/oxygen cathode in the metal-air battery. Examples of metal-air battery include, but are not limited to, Aluminum-air, Iron-air, Lithium-air, Magnesium-air, Zinc-air, Silicon-air, Germanium-air, Calcium-air, Potassium-air, Sodium-air, Tin-air, and any combination thereof.

Figure 5:
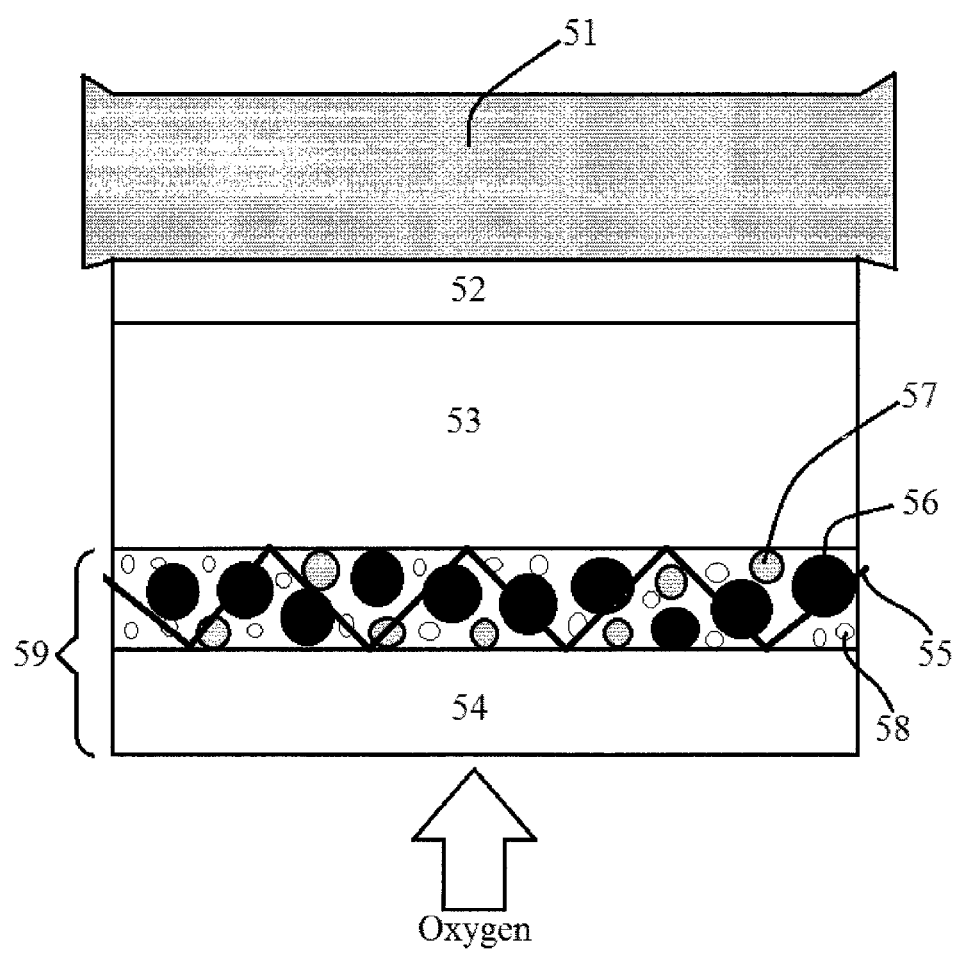
FIG. 5 shows the structure of a bifunctional aluminum-air battery in accordance with an exemplary embodiment of the present invention.

In a preferred embodiment, bifunctional aluminum-air (Al-air) battery is used as various structural parts in vehicles, because of the abundance of aluminum, affordability, and the extremely high specific energy (6000~8000 W·h/kg in theory). Another technical merit associated with bifunctional metal-air battery is that the battery is not confined in a space with limited air flow. As a structural part, the battery will have a large surface area exposed to ambient air, and the oxidization of the metal "fuel" will be greatly facilitated. FIG. 5 demonstrates the structure of an aluminum-air battery, which includes a bifunctional anode 51 comprising Al, and an air cathode 59. Between electrolyte 53 and anode 51 is a layer 52 comprising $Al(OH)_3$, formed by a half reaction of $Al+3OH^-\rightarrow Al(OH)_3+3e$. On the interfacial area between electrolyte 53 and layer 52, a reaction $Al(OH)_3+OH^-\rightarrow Al(OH)_4^-$ may occur. Air cathode 59 include air-permeable hydrophobic membrane 54, through which oxygen can migrate to a layer comprising hydrophilic support 56, hydrophobic binder 57, and catalyst 58. The electrical current from a half reaction, $O_2+2H_2O+4e\rightarrow 4OH^-$, flows through metal (e.g. Ni) mesh current collector 55. Al-air batteries produce electricity from the reaction of oxygen in the air with aluminum. Once bifunctional anode 51 is consumed by its reaction with atmospheric oxygen to form hydrated aluminum oxide, the battery will no longer produce electricity. Anode 51 made of pure aluminum may be corroded by electrolyte 53, so in preferred embodiments, the aluminum is alloyed with tin or other elements. The hydrated alumina in layer 52 created by the cell reaction may form a gel-like substance at the anode and reduces the electricity output. In preferable embodiment, additives that form the alumina as a powder rather than a gel may be employed. Air cathode 59 may consist of a reactive layer of carbon with a nickel-grid current collector 55, a cobalt catalyst 58, and a porous hydrophobic polytetrafluoroethylene (PTFE) film 54 that prevents electrolyte leakage. The oxygen in the air passes through the PTFE film 54, and then reacts with the water to create hydroxide ions.

When a bifunctional primary battery of the present invention is being used to supply electricity, the mechanical strength and other properties of its structural aspect may be degraded or deteriorated. For example, $Al(OH)_3$ or $Al_2O_3$ is much weaker than Al alloy in terms of mechanical strength. Therefore, the bifunctional primary battery of the present invention is preferably designed as a replaceable module or part in the vehicle. After a new battery replaces a used battery, both the energy level as a battery and the mechanical properties as a structural part are completely restored. Non-essential structural parts in the vehicle are preferably made as a bifunctional primary battery. The term "non-essential" is intended to mean that the part does not play a critical role for the vehicle's fundamental performance. If the part is degraded or deteriorated, it will not disable the vehicle's mobility. For an electric car, the roof, the fender, the door, the front bumper, the rear bumper, and the decklid etc. are non-essential parts, because these parts' worsening mechanical performance during a trip will not stop the car from moving to the destination. By the same token, the landing gear, landing rod, and the skin etc. are non-essential parts for an airplane and an UAV, because their worsening mechanical performance during a trip will not stop the airplane and UAV from flying. In some embodiments, essential structural parts in the vehicle can also be made as a bifunctional primary battery, as long as the battery reaction is well controlled, and it only deteriorates the part at an acceptable level. For example, a "shallow" or "superficial" oxidization on the surface of an airplane wing may not break the wing immediately, and the normal flight of the airplane can still be maintained.

In other embodiments, the bifunctional primary battery of the invention may be used as a reserve battery, a stand-by battery, or a backup battery. When long storage is required, reserve batteries are often used, since the active chemicals of the battery are segregated until needed, thus reducing self-discharge. A reserve battery is inert until it is activated, while a backup battery is already functional, even if it is not delivering current. Reserve batteries may be activated by addition of water, by adding electrolyte, by introducing a gas into the cell that is either the active cathode material or part of the electrolyte, or by heating a solid electrolyte to a temperature at which it becomes conductive.

Bifunctional Secondary Battery

In a second group of embodiments, the power source of the invention is a bifunctional secondary battery. Unlike a primary battery, the electrochemical reaction occurring in secondary battery is reversible.

In a preferred secondary battery according to the invention, its bifunctional component(s) include(s) the anode, the cathode, the current collector, the battery housing, the external or internal wire, or any combination thereof. Such bifunctional component is preferably made from a material that is electrically conductive and mechanically strong, such as an aluminum alloy, a carbon fiber or graphite reinforced polymer (CFRP), graphene, and carbon nanotube reinforced polymer (CNRP). CNRP is several times stronger and tougher than CFRP, but it still uses carbon fiber as the primary reinforcement, but the binding matrix is a carbon nanotube filled epoxy.

In various embodiments, the electrodes may be composed of a high strength composite material, such as AL alloy, carbon fiber, CNT, graphene, the polymeric resin composite material. Preferred materials are those already in the aircraft manufacture, such as Al—Mg alloy, carbon fiber, nylon and the like. The additives for high strength materials and composites used for the electric aircraft body of the present invention, include, but are not limited to, Si, Li, C, S, Al, Na, K, Ca, Mg and other metal and nonmetal and their compounds.

Figure 6:
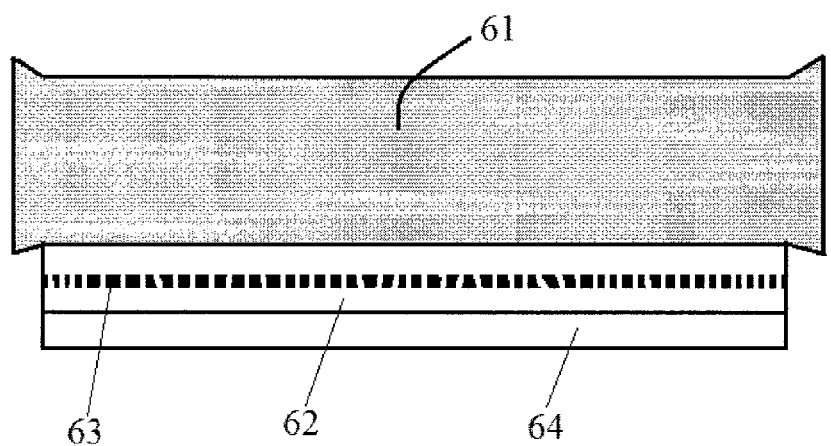
FIG. 6 schematically illustrates the structure of a bifunctional secondary battery in accordance with an exemplary embodiment of the present invention.

FIG. 6 schematically illustrates a bifunctional secondary battery. The bifunctional component 61 may be an electrode, or an electrode combined with a current collector and/or a battery housing and/or a wire. Between component 61 and another electrode 64 is electrolyte 62 and separator 63. In some embodiments, electrode 64 may also be made bifunctional.

Thin lithium battery is a preferred power source. The battery may have three major parts: one anode, one cathode, and an electrolyte. The active ion, such as lithium, is intercalated and extracted from the electrodes during charge and discharge. The electrolyte is an ion conductive medium of polymers and salt. During discharge, ions are transported through the electrolyte, from anode to cathode. Electrons are transported from the electrodes via an outer circuit. A battery with short ion peculation distances is preferable from electrochemical point of view. Known methods may be used to manufacture thin electrodes and electrolytes. This layered structure is similar to composites and therefore it is used for the production of a structural composite with ability to store electrical energy. The electrode may have certain shape and mechanical strength, and be combined with the electrolyte.

In an embodiment, the battery integrated structural parts of the present invention comprises a cathode, an anode, an electrolyte, a separator, an active material and a binder composition built-into such multifunctional structures; and functions as both the storage batteries, and structural components of a vehicle such as an electric aircraft body. A separator is a permeable membrane placed between a battery's anode and cathode. The main function of a separator is to keep the two electrodes apart to prevent electrical short circuits while also allowing the transport of ionic charge carriers that are needed to close the circuit during the passage of current in an electrochemical cell.

In a first example, component 61/64 is made of an aluminum alloy that comprises 0.1%~0.5% (by weight) of scandium, and such component functions as the skin of an airplane.

In a second example, component 61/64 is made of an aluminum alloy that comprises zinc (7.3~8.3% by weight), magnesium (2.2~3.0% by weight), copper (1.6~2.4% by weight), zirconium (0.05~0.15% by weight), silicon, iron, manganese, chromium, and titanium; and such component functions as a valve body or connecting rod in the vehicle.

In a third example, component 61/64 is made of an aluminum alloy that comprises by weight 5.6~6.1% zinc, 2.1~2.5% magnesium, 1.2~1.6% copper, and less than 0.5% of silicon, iron, manganese, titanium and chromium; and such component functions as the skin of an airplane.

In a fourth example, component 61/64 is made of an aluminum alloy that comprises lithium; and such component functions as the wings and fuselages of an aircraft.

In a fifth example, component 61/64 is made of an aluminum alloy that comprises by weight 0.2~0.6% silicon, 0~0.35% iron, 0~0.10% copper, 0~0.10% manganese, 0.45~0.9% magnesium, 0~0.10% chromium, 0~0.10% zinc, and 0~0.10% titanium; and such component functions as window frame and door frame in a vehicle.

In a sixth example, component 61/64 is made of an aluminum alloy that comprises copper; and such component functions as the wings and fuselages of an aircraft.

In a seventh example, component 61/64 is made of an aluminum alloy that comprises by weight 0.4~0.8% silicon, 0~0.7% iron, 0.15~0.4% copper, 0~0.15% manganese, 0.8~4.2% magnesium, 0.04~0.35% chromium, 0~0.25% zinc, and 0~0.15% titanium; and such component functions as the wings and fuselages of an aircraft, or the wheel spacer of a land vehicle.

In an eighth example, component 61/64 is made of an aluminum alloy that comprises lithium; and such component functions as the wings and fuselages of an aircraft.

Bifunctional Film Capacitor

In a third group of embodiments, the power source of the invention comprises a bifunctional film capacitor.

Figure 7A:
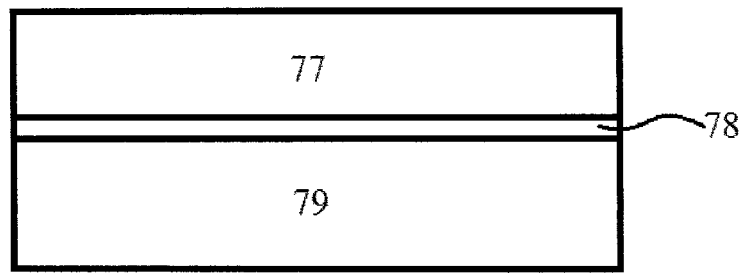
FIG. 7A shows the structure of a bifunctional film capacitor in accordance with an exemplary embodiment of the present invention.
Figure 9:
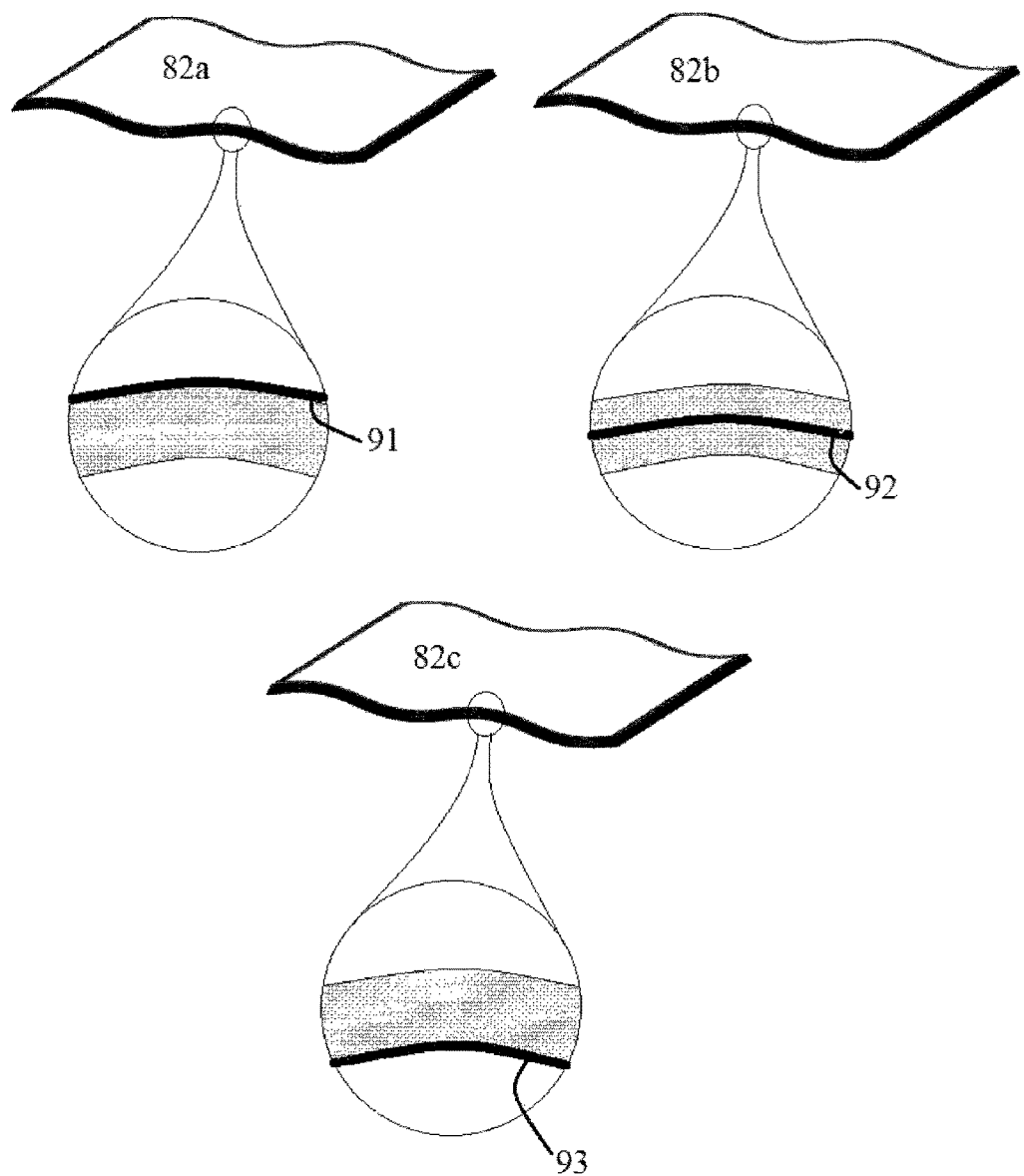
FIG. 9 illustrates that the curved solid panel in FIG. 8 is integrated with one bifunctional power source in accordance with an exemplary embodiment of the present invention.
Figure 13:
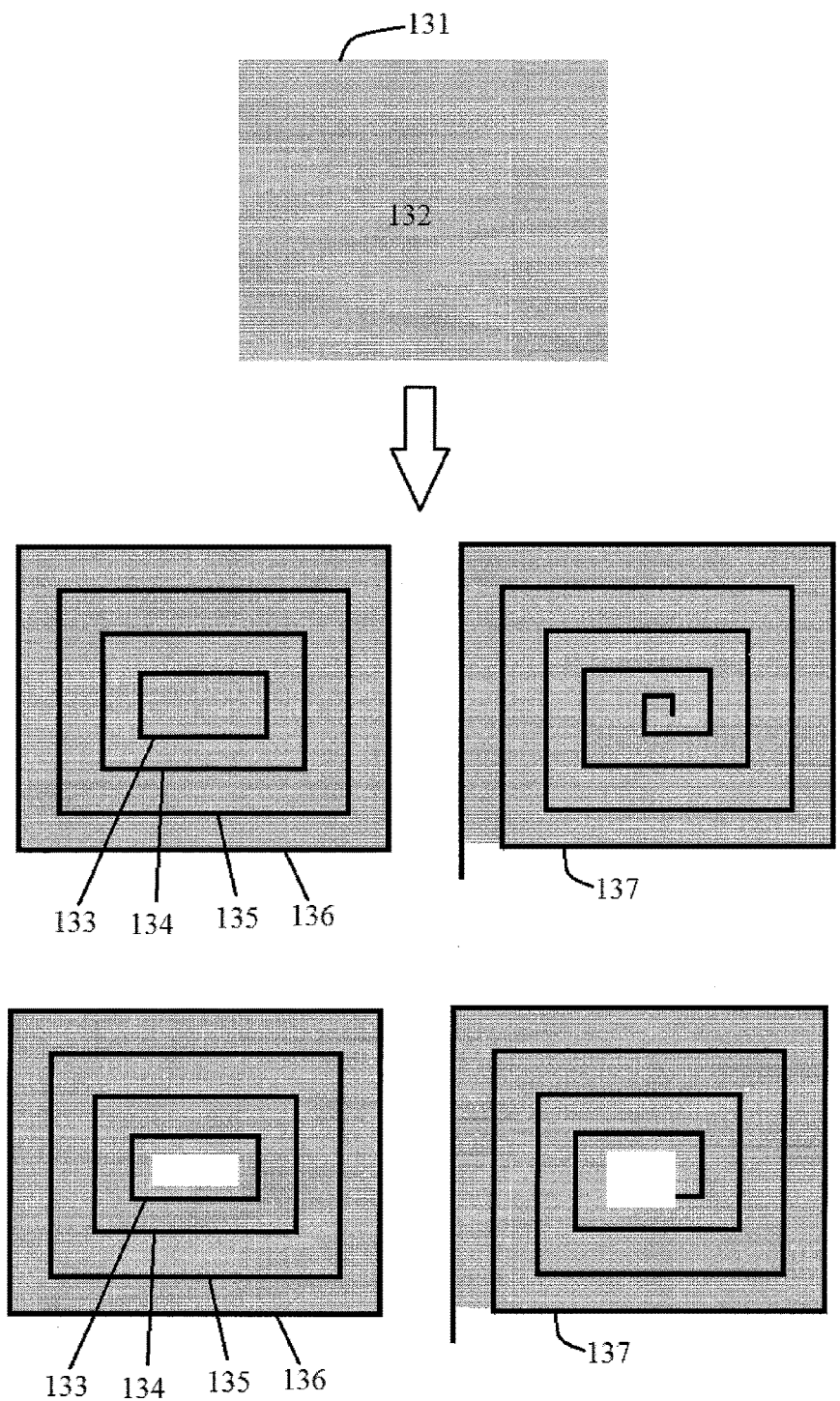
FIG. 13 illustrates that that a solid structural part such as a rectangular rod is integrated with one or more bifunctional power sources in accordance with an exemplary embodiment of the present invention.
Figure 14:
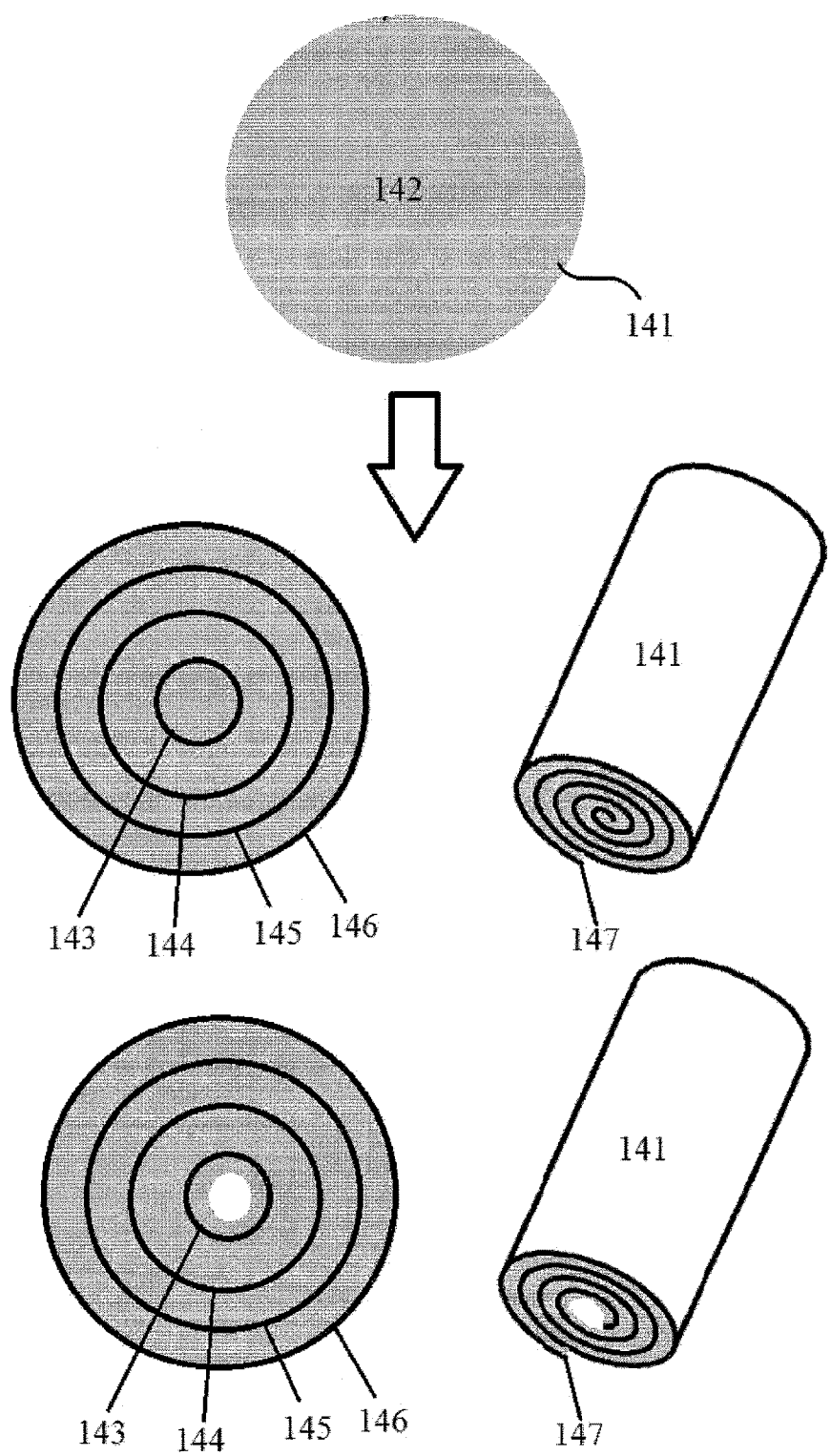
FIG. 14 illustrates that that a solid structural part such as a round rod is integrated with one or more bifunctional power sources in accordance with an exemplary embodiment of the present invention.

Referring to FIG. 7A, electrodes 77 and 79 of a film capacitors may be made of a metal or alloy such as aluminum or zinc. Sandwiched between electrodes 77 and 79 is insulating plastic film 78 as the dielectric, including polypropylene (PP), polyester, polyethylene terephthalate (PET), polyethylene naphthalate (PEN), polyphenylene sulfide (PPS), polytetrafluoroethylene (PTFE), polystyrene (PS), and polycarbonate (PC). Electrodes 77 and 79 may be candidates of the bifunctional components according to the present invention. With an additional layer of insulating plastic film, a film capacitor can be wound into a cylindrical shaped or rectangular shaped winding, and used as a structural part such as a solid rod, as shown in FIGS. 13 and 14. Alternatively, a film capacitor can be built on the upper or lower surface of a bulk metal as shown in FIG. 9, using the bulk metal as one electrode 77/79, and using a thin metal layer as another electrode 79/77.

Bifunctional Supercapacitor

In a fourth group of embodiments, the power source of the invention comprises a bifunctional supercapacitor, which can accept and deliver charge much faster, and tolerate many more charge and discharge cycles, than secondary batteries. Typically, a supercapacitor utilizes electrostatic double-layer capacitance, electrochemical pseudocapacitance, or a hybrid of the both, rather than conventional solid dielectric material for ordinary capacitors, which is an electrical insulator that can be polarized by an applied electric field. A capacitor (originally known as a condenser) is a passive two-terminal electrical component used to temporarily store electrical energy in an electric field. Most capacitors contain at least two electrical conductors (plates) separated by a dielectric (i.e. an insulator that can store energy by becoming polarized). The conductors can be thin films, foils or sintered beads of metal or conductive electrolyte, etc. The nonconducting dielectric acts to increase the capacitor's charge capacity. Materials commonly used as dielectrics include glass, ceramic, plastic film, paper, mica, and oxide layers.

In a preferred supercapacitor according to the invention, its bifunctional component(s) include(s) the current collector for its positive plate (or polarizable electrode), the current collector for its negative plate (or polarizable electrode), the supercapacitor housing, or any combination thereof. Such bifunctional component is preferably made from an aluminum alloy, a carbon fiber or graphite reinforced polymer (CFRP), graphene, and carbon nanotube reinforced polymer (CNRP).

Figure 7B:
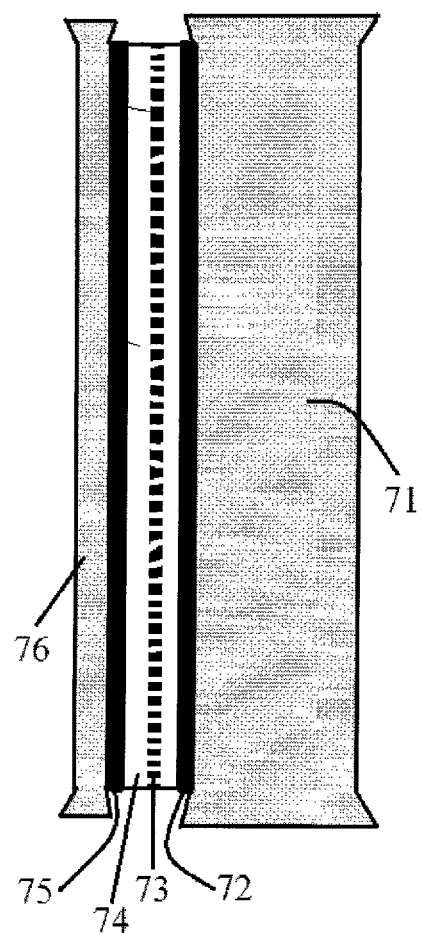
FIG. 7B schematically illustrates the structure of a bifunctional supercapacitor in accordance with an exemplary embodiment of the present invention.

FIG. 7B schematically illustrates a bifunctional supercapacitor. Electrostatic double-layer capacitors (EDLC) employ carbon electrodes 72/75 or derivatives thereof and achieve separation of charge in a Helmholtz double layer at the interface between the surface of conductive electrode 71 and an electrolyte 74. Double-layer capacitors have much higher capacitance values than conventional capacitors, arising from the extremely large surface area of activated carbon electrodes 72 and the extremely thin double-layer distance on the order of less than 1 nm, much smaller than in a conventional capacitor. In EDLC, two electrodes 72 and 75 separated by an ion-permeable membrane (separator) 73, and an electrolyte 74 ionically connecting both electrodes 72 and 75. While charge in conventional capacitors is transferred via electrons, capacitance in double-layer capacitors is related to the limited moving speed of ions in the electrolyte 74 and the resistive porous structure of the electrodes 72 and 75. Since no chemical changes take place within the electrode or electrolyte, charging and discharging electric double-layers in principle is unlimited. Real supercapacitors lifetimes are only limited by electrolyte evaporation effects. When the electrodes 72 and 75 are polarized by an applied voltage, ions in the electrolyte form electric double layers of opposite polarity to the electrode's polarity. For example, positively polarized electrodes will have a layer of negative ions at the electrode/electrolyte interface along with a charge-balancing layer of positive ions adsorbing onto the negative layer. The opposite is true for the negatively polarized electrode. Sometimes, depending on electrode material and surface shape, some ions may permeate the double layer and become specifically adsorbed ions and contribute with pseudocapacitance to the total capacitance of the supercapacitor.

Electrochemical pseudocapacitors use metal oxide or conducting polymer electrodes 72/75, and rely on Faradaic electron charge-transfer with redox reactions, intercalation or electrosorption. As described above, applying a voltage at the electrochemical capacitor terminals moves electrolyte ions to the opposite polarized electrode and forms a double-layer in which a single layer of solvent molecules acts as separator. Pseudocapacitance arises when specifically adsorbed ions out of the electrolyte pervade the double-layer. This pseudocapacitance stores electrical energy by means of reversible faradaic redox reactions on the surface of suitable electrodes 72/75 in an electrochemical capacitor with an electric double-layer. Pseudocapacitance is accompanied with an electron charge-transfer between electrolyte and electrode coming from a de-solvated and adsorbed ion. This faradaic charge transfer originates by a very fast sequence of reversible redox, intercalation or electrosorption processes. The adsorbed ion has no chemical reaction with the atoms of the electrode 72/75 since only a charge-transfer take place. The electrons involved in the faradaic processes are transferred to or from valence electron states (orbitals) of the redox electrode reagent. They enter the negative electrode 72/75 and are collected in the current collector 71/76 and flow through the external circuit to the positive electrode 75/72 where a second double-layer with an equal number of anions has formed. The electrons reaching the positive electrode 75/72 are not transferred to the anions forming the double-layer, instead they remain in the transition-metal ions of the electrode's surface. As such, the storage capacity of faradaic pseudocapacitance is limited by the finite quantity of reagent in the available surface. A faradaic pseudocapacitance only occurs together with a static double-layer capacitance, and its magnitude may exceed the value of double-layer capacitance for the same surface area by factor 100, depending on the nature and the structure of the electrode, because all the pseudocapacitance reactions take place only with de-solvated ions, which are much smaller than solvated ion with their solvating shell.

Hybrid capacitors, such as the lithium-ion capacitor, use two different electrodes, one of which exhibits mostly electrostatic capacitance and the other mostly electrochemical capacitance.

The bifunctional supercapacitors of the invention may be made in different styles such as flat with a single pair of electrodes, wound in a cylindrical case or stacked in a rectangular case. Double-layer capacitors (EDLCs) use activated carbon electrodes or derivatives with much higher electrostatic double-layer capacitance than electrochemical pseudocapacitance. Pseudocapacitors use transition metal oxide or conducting polymer electrodes with a high electrochemical pseudocapacitance. Hybrid capacitors adopt asymmetric electrodes, one of which exhibits mostly electrostatic and the other mostly electrochemical capacitance, such as lithium-ion capacitors. The amount of double-layer as well as pseudocapacitance stored per unit voltage in a supercapacitor is predominantly a function of the electrode surface area. Therefore, supercapacitor electrodes are typically made of porous, spongy material with an extraordinarily high specific surface area, such as activated carbon. Additionally, the ability of the electrode material to perform faradaic charge transfers enhances the total capacitance. The most commonly used electrode material for supercapacitors is carbon in various manifestations such as activated carbon (AC), carbon fiber-cloth (AFC), carbide-derived carbon (CDC), carbon aerogel, graphite, graphene, graphane and carbon nanotubes (CNTs). Carbon-based electrodes exhibit predominantly static double-layer capacitance, even though a small amount of pseudocapacitance may also be present depending on the pore size distribution. Pseudocapacitance with faradaic charge transfer is also always present in carbon double-layer electrodes, but the amount of pseudocapacitance in EDLC electrodes is relatively low. Pseudocapacitance electrodes must have surfaces able to achieve sufficient faradaic processes to have a majority of pseudocapacitance. Pseudocapacitance electrodes without double-layer capacitance do not exist. Electrodes of transition metal oxides exhibit high amount of pseudocapacitance. Oxides of transition metals including ruthenium ($RuO_2$), iridium ($IrO_2$), iron ($Fe_3O_4$), manganese ($MnO_2$), and sulfides such as titanium sulfide ($TiS_2$) may generate strong faradaic electron-transferring reactions combined with low resistance. Ruthenium dioxide in combination with $H_2SO_4$ electrolyte provides specific capacitance of 720 F/g and a high specific energy of 26.7 Wh/kg (96.12 kJ/kg). Electron-conducting polymers is another option for pseudocapacitive material. Although mechanically weak, conductive polymers have high conductivity, resulting in a low ESR and a relatively high capacitance. Such conducting polymers include polyaniline, polythiophene, polypyrrole and polyacetylene. Such electrodes also employ electrochemical doping or dedoping of the polymers with anions and cations. Electrodes may be made from, or coated, with conductive polymers. In a preferred embodiment, polyacene electrodes are used because of their great cycling stability.

In an embodiment as shown in FIG. 7B, the supercapacitors of the invention may be constructed with a bifunctional current collector 71 (preferably much thicker and stronger than a metal foil) and a regular current collector 76 (not bifunctional, e.g. a metal foil), or two bifunctional current collectors 71 and 76. Each collector 71/76 is coated with an electrode material such as activated carbon and metal oxide. The current collectors serve as the power connection between the electrode material and the external terminals of the capacitor. The activated carbon may be electrochemically etched, so that the surface of the material is about a factor 100,000 larger than the smooth surface. The electrodes are kept apart by an ion-permeable membrane (separator 73) used as an insulator to protect the electrodes against short circuits. Then, the cell is impregnated with a liquid or viscous electrolyte of organic or aqueous type, and then hermetically sealed to ensure stable behavior over the specified lifetime. The electrolyte, an ionic conductor, enters the pores of the electrodes and serves as the conductive connection between the electrodes 72 and 75 across the separator 73.

Bifunctional Structural Part

The bifunctional power source 1x, 2x and 3x, the entire bifunctional batteries as shown in FIGS. 5 and 6, the entire bifunctional film capacitor as shown in FIG. 7A, the entire bifunctional supercapacitor as shown in FIG. 7B, and the bifunctional components therein such as components 51, 55, 61, 64, 71, 76, 77 and 79 as shown in FIGS. 5-6, 7A and 7B may be used to build any suitable structural part(s) in the vehicle, making such structural part(s) bifunctional. In other words, various structural prats in a vehicle may be integrated with a primary battery, a secondary battery, a film capacitor, a supercapacitor, or any combination thereof.

In preferred embodiments, except the bifunctional components, all the components in the power source are films, thin layers, or thin sheets. Depending on the mechanical requirements in different designs, sometimes the bifunctional components may also be made as films, thin layers, or thin sheets. However, sometimes it may be necessary to build the bifunctional components bigger, thicker or stronger to meet the requirement imposed on a vehicle structural part.

Figure 8:
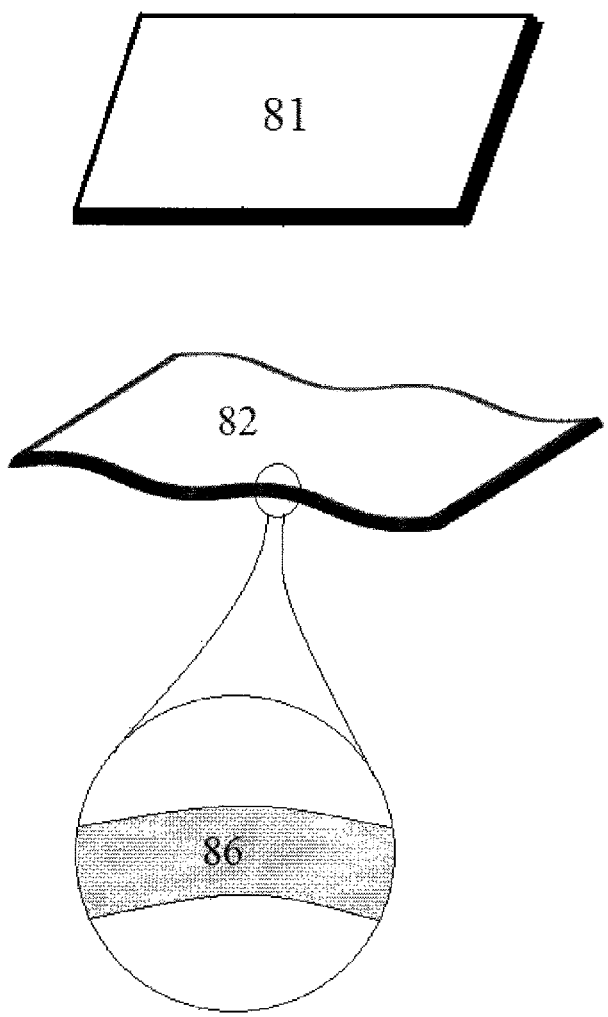
FIG. 8 shows a structural part in a vehicle such as a flat or curved solid panel that is not bifunctional.

In the following, a few representative examples of structural prats will be used to illustrate the present invention. FIG. 8 shows a structural part such as a flat solid panel 81 and a curved solid panel 82 in a vehicle. Both panels are made of material 86 that is electrically conductive and mechanically robust. The electrochemical property of material 86 is suitable for making an electrode (i.e. an anode or a cathode), a current collector, a bipolar plate, a negative plate, a positive plate, a battery housing, a supercapacitor housing, a wire, and the like. In a preferred embodiment, material 86 is selected from a metal, an alloy, a conductive polymer, a carbon fiber or graphite reinforced polymer (CFRP), carbon nanotube reinforced polymer (CNRP), graphene, or any combination thereof.

Take curved panel 82 as an example. FIG. 9 illustrates that the curved solid panel 82 in FIG. 8 is integrated with one bifunctional power source, and is modified into curved solid panel 82a, 82b and 82c. The power source preferably has a shape of sheet or thin film, such as thin film battery and thin film supercapacitors. Thin film power source 91 is configured to be a "coating" on the upper surface (e. external surface for a vehicle) of panel 82a. For example, a pressure-sensitive adhesive may be used to adhere active material to an electrode (material 86). Thin film power source 92 may also be configured to be sandwiched between the upper surface and the lower surface of panel 82b. Thin film power source 93 is configured to be a "coating" on the lower surface (e. internal surface for a vehicle) of panel 82c. In these configurations, material 86 functions as an electrode (i.e. an anode or a cathode), a current collector, a bipolar plate, a negative plate, a positive plate, a battery housing, a supercapacitor housing, and the like, for power sources 91, 92 and 93.

Figure 10:
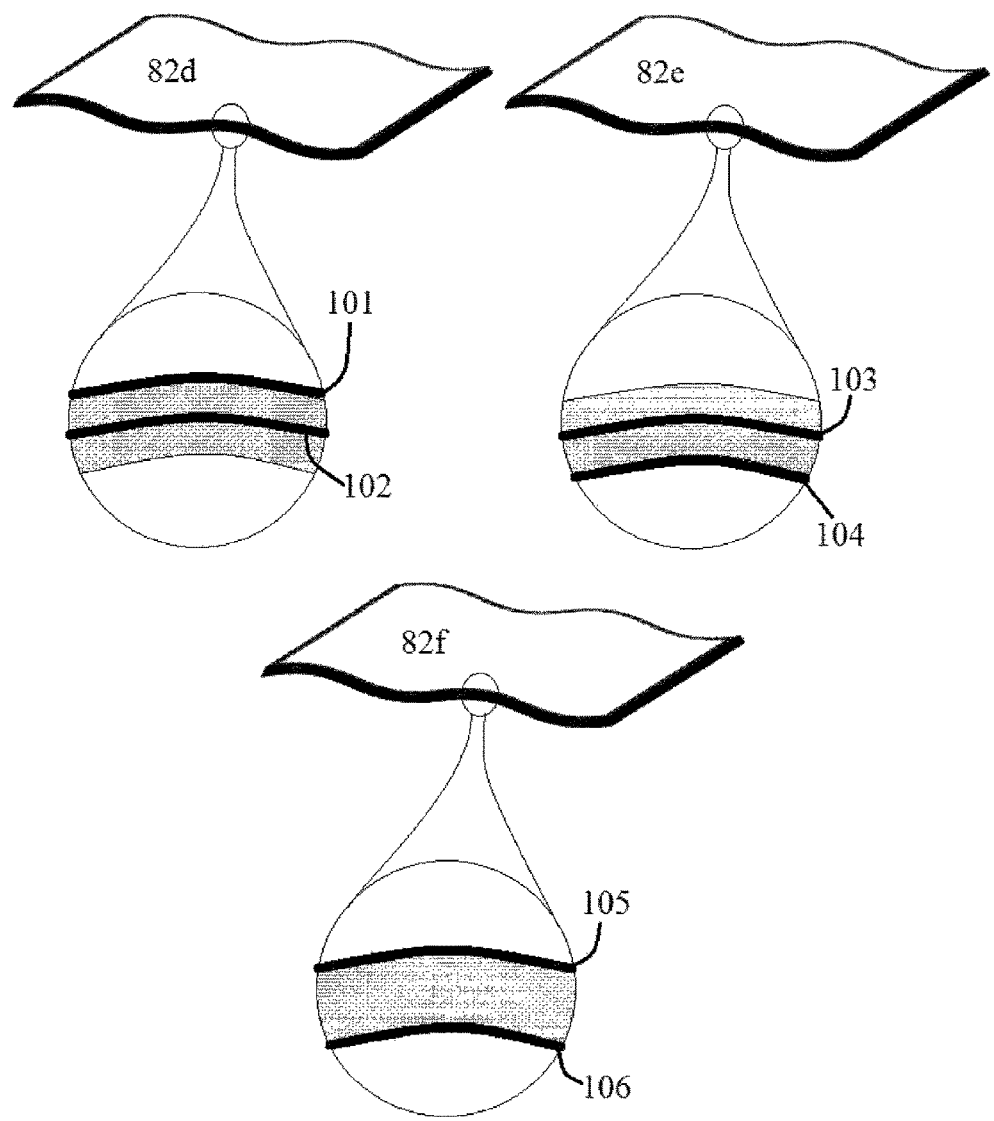
FIG. 10 depicts that the curved solid panel in FIG. 8 is integrated with two bifunctional power sources in accordance with an exemplary embodiment of the present invention.
Figure 11:
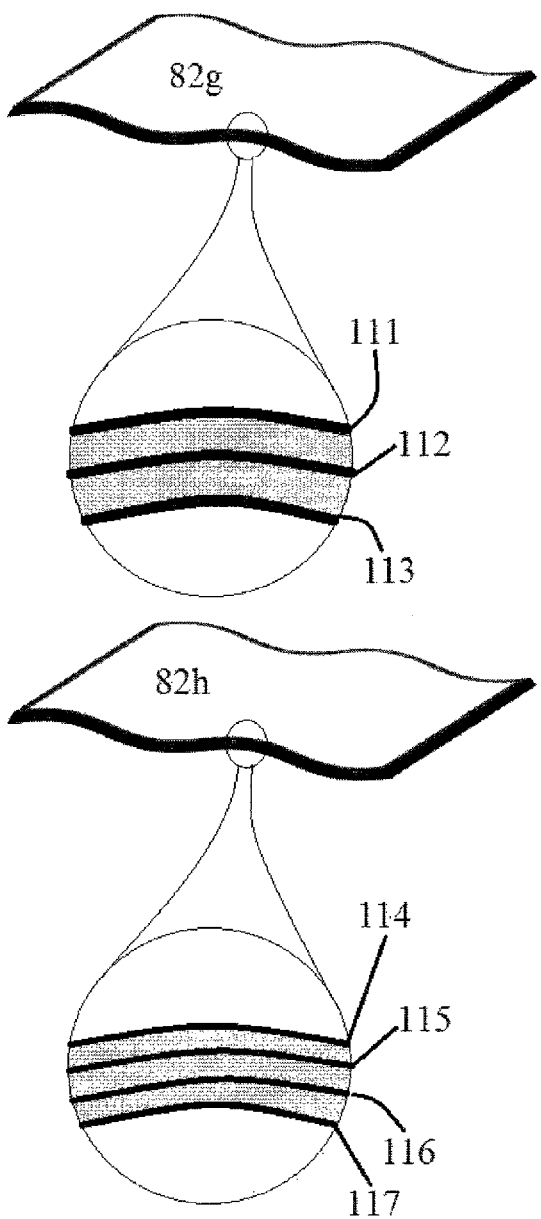
FIG. 11 shows that the curved solid panel in FIG. 8 is integrated with three or more bifunctional power sources in accordance with an exemplary embodiment of the present invention.

Similar to FIG. 9, FIG. 10 depicts that the curved solid panel 82 in FIG. 8 is integrated with two bifunctional power sources, and is modified into curved solid panel 82d, 82e and 82f. Thin film power sources 101 and 105 are similar to 91; thin film power sources 102 and 103 are similar to 92; and thin film power sources 104 and 106 are similar to 93. Also similar to FIG. 9, FIG. 11 shows that the curved solid panel 82 in FIG. 8 is integrated with three or more bifunctional power sources, and is modified into curved solid panel 82g and 82h. Thin film power sources 111 and 114 are similar to 91; thin film power sources 112, 115 and 116 are similar to 92; and thin film power sources 113 and 117 are similar to 93.

Figure 12:
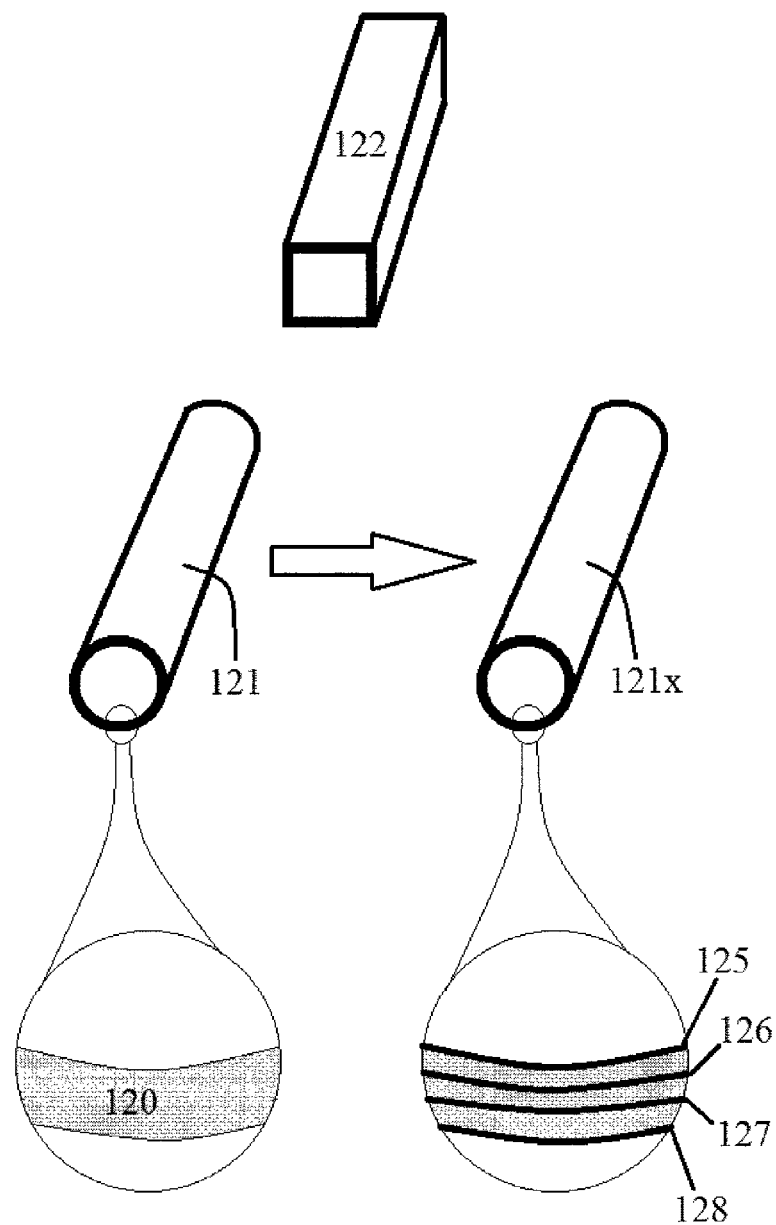
FIG. 12 demonstrates that a hollow structural part such as a round pipe and a rectangular pipe is integrated with one or more bifunctional power sources in accordance with an exemplary embodiment of the present invention.

FIG. 12 demonstrates that a hollow structural part such as a round pipe 121 and a rectangular pipe 122, both of which are made of material 120. Round pipe 121 is modified into bifunctional pipe 121x, by integrating with one or more bifunctional circular power sources selected from 125, 126, 127 and 128, alone or in any combination, in a stacked configuration. Material 120 is similar to material 86; thin film power source 125 is similar to 91; thin film power sources 126 and 127 are similar to 92; and thin film power source 128 is similar to 93.

FIG. 13 illustrates the cross-sectional view of a solid structural part such as a rectangular rod 131. Rod 131 is made of a material 132 similar to material 86. Rod 131 may be integrated with one or more bifunctional power sources selected from 133, 134, 135, and 136, alone or stacked in any combination, and be made solid or hollow. The shape of power sources 133, 134, 135, and 136 is like four rectangular pipes with different sizes. A smaller pipe is inserted into a bigger pipe, which is inserted into an even bigger pipe. All the pipes have the same elongation direction as rod 131. Alternatively, rod 131 may be integrated with one bifunctional power source 137, and be made solid or hollow. Power source 137, together with associated rod material 132 and an insulator layer (not shown) preventing the direct contact between anode and cathode, is like a laminated film, and the film is wrapped up or rolled into a bifunctional rod, solid or hollow (pipe like).

FIG. 14 illustrates the cross-sectional view of a solid structural part such as a round rod 141. Rod 141 is made of a material 142 similar to material 86. Rod 141 may be integrated with one or more bifunctional power sources selected from 143, 144, 145, and 146, alone or stacked in any combination, and be made solid or hollow. The shape of power sources 143, 144, 145, and 146 is like round pipes with different sizes. A smaller pipe is inserted into a bigger pipe, which is inserted into an even bigger pipe. All the pipes have the same elongation direction as rod 141. Alternatively, rod 141 may be integrated with one bifunctional power source 147, and be made solid or hollow. Power source 147, together with associated rod material 142 and an insulator layer (not shown) preventing the direct contact between anode and cathode, is like a laminated film, and the film is wrapped up or rolled into a bifunctional rod, solid or hollow (pipe like).

In the foregoing specification, embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicant to be the scope of the invention, is the literal and equivalent scope of the set of claims that issue from this application, in the specific form in which such claims issue, including any subsequent correction.

The invention claimed is:
1. A vehicle comprising a power source and a structural part, wherein the power source includes a plurality of components, and at least one of the plurality of components serves as at least a portion of the structural part,
   wherein the power source comprises a metal-air battery including a metal anode or an alloy anode, wherein said anode serves as said at least a portion of the structural part, and wherein the structural part is non-essential for the vehicle's mobility and is replaceable between trips of the vehicle,
   wherein said anode is oxidized or consumed during a trip of the vehicle,
   wherein said vehicle is selected from an aircraft, an unmanned aerial vehicle (UAV), a spacecraft, a watercraft including sub-surface watercraft, and a land vehicle e.g. an electrical car or truck, and
   wherein the non-essential part is selected from aircraft fuselage, aircraft skin, watercraft hull, car floor, car roof, car fender, car bumper, car decklid, car rocker, car door, vehicle window frame, vehicle door frame, main hatch, under the hatch before, quadrotor frame, camera mounting frame, landing bar, and landing gear.

2. The vehicle according to claim 1, wherein said power source further comprises a primary battery, a secondary battery, a film capacitor, or a supercapacitor.

3. The vehicle according to claim 2, wherein said at least one of the plurality of components in the power source comprises an electrode, an anode, a cathode, a current collector, a wire, a housing, a bipolar plate, a negative plate, a positive plate, or any combination thereof; and wherein the structural part is selected from aircraft wings, aircraft fuselages, aircraft skin, valve body, watercraft hull, connecting rod, car floor, car roof, car fender, car bumper, car decklid, car rocker, car door, vehicle window frame, vehicle door frame, pipe, rod, car chassis, wheel spacer, main hatch, under the hatch before, tail pipe, horizontal tail, vertical tail, quadrotor frame, camera mounting frame, landing bar, and landing gear.

4. The vehicle according to claim 3, wherein said at least one of the plurality of components is made of a metal, an alloy, a conductive polymer, a conductive composite material, a carbon fiber or graphite reinforced polymer (CFRP), graphene, carbon nanotube reinforced polymer (CNRP), or any combination thereof.

5. The vehicle according to claim 4, wherein the metal or the alloy comprises Aluminum, Iron, Lithium, Magnesium, Manganese, Copper, Zinc, Zirconium, Chromium, Titanium, Scandium, Silicon, Germanium, Calcium, Potassium, Sodium, Tin, or any combination thereof.

6. The vehicle according to claim 1, wherein the metal-air battery is aluminum-air (Al-air) battery.

7. The vehicle according to claim 1, wherein the metal-air battery includes an air cathode having a current collector, and said current collector serves as said at least a portion of the structural part.

8. The vehicle according to claim 2, wherein the secondary battery includes an electrode made of an aluminum alloy, and said electrode serves as said at least a portion of the structural part.

9. The vehicle according to claim 8, wherein said aluminum alloy comprises 0.1%~0.5% (by weight) of scandium, and the electrode functions as the skin of an airplane.

10. The vehicle according to claim 8, wherein said aluminum alloy comprises zinc (7.3~8.3% by weight), magnesium (2.2~3.0% by weight), copper (1.6~2.4% by weight), zirconium (0.05~0.15% by weight), silicon, iron, manganese, chromium, and titanium, and the electrode functions as a valve body or connecting rod in the vehicle.

11. The vehicle according to claim 8, wherein said aluminum alloy comprises by weight 5.6~6.1% zinc, 2.1~2.5% magnesium, 1.2~1.6% copper, and less than 0.5% of silicon, iron, manganese, titanium and chromium; and the electrode functions as the skin of an airplane.

12. The vehicle according to claim 8, wherein said aluminum alloy comprises lithium; and the electrode functions as the wings and fuselages of an aircraft.

13. The vehicle according to claim 8, wherein said aluminum alloy comprises by weight 0.2~0.6% silicon, 0~0.35% iron, 0~0.10% copper, 0~0.10% manganese, 0.45~0.9% magnesium, 0~0.10% chromium, 0~0.10% zinc, and 0~0.10% titanium; and the electrode functions as window frame and door frame in a vehicle.

14. The vehicle according to claim 8, wherein said aluminum alloy comprises copper or lithium; and the electrode functions as the wings and fuselages of an aircraft.

15. The vehicle according to claim 8, wherein said aluminum alloy comprises by weight 0.4~0.8% silicon, 0~0.7% iron, 0.15~0.4% copper, 0~0.15% manganese, 0.8~1.2% magnesium, 0.04~0.35% chromium, 0~0.25% zinc, and 0~0.15% titanium; and the electrode functions as the wings and fuselages of an aircraft, or the wheel spacer of a land vehicle.

16. The vehicle according to claim 2, wherein said film capacitor includes electrodes made of a metal or alloy such as aluminum or zinc, and an insulating, plastic dielectric film 78 selected from polypropylene (PP), polyester, polyethylene terephthalate (PET), polyethylene naphthalate (PEN), polyphenylene sulfide (PPS), polytetrafluoroethylene (PTFE), polystyrene (PS), and polycarbonate (PC).

17. The vehicle according to claim 2, wherein said supercapacitor utilizes electrostatic double-layer capacitance, electrochemical pseudocapacitance, or a hybrid of the both.

18. The vehicle according to claim 17, wherein activated carbon electrodes are used for electrostatic double-layer capacitance, wherein transition metal oxide and conducting polymer electrodes are used for electrochemical pseudocapacitance, and wherein current collectors of said supercapacitor serve as said at least a portion of the structural part.

* * * * *